United States Patent [19]
Garland et al.

[11] Patent Number: 5,802,155
[45] Date of Patent: Sep. 1, 1998

[54] METHOD AND APPARATUS FOR CONTROLLING REGULAR AND SUPRESSED RINGING CONNECTIONS IN A TELECOMMUNICATIONS NETWORK

[75] Inventors: Stuart Mandel Garland, Morton Grove; David B. Smith, Hinsdale, both of Ill.

[73] Assignee: Lucent Techologies Inc., Murray Hill, N.J.

[21] Appl. No.: 559,512

[22] Filed: Nov. 15, 1995

[51] Int. Cl.$^6$ .............. H04M 3/42; H04M 11/00
[52] U.S. Cl. .............. 379/106.09; 379/106.01; 379/106.5; 379/207; 379/242
[58] Field of Search .............. 379/106, 107, 379/201, 207, 38, 90, 93, 208, 209, 242, 219, 220, 221, 215, 377, 393, 196, 93.35, 106.01, 106.05, 106.09, 243, 93.09, 106.02, 244

[56] References Cited

U.S. PATENT DOCUMENTS

| | | | |
|---|---|---|---|
| 4,238,783 | 12/1980 | Miller | 379/106 |
| 4,531,527 | 7/1985 | Reinhold, Jr. et al. | 379/38 |
| 4,833,618 | 5/1989 | Verma et al. | 379/107 |
| 4,847,892 | 7/1989 | Shelley | 379/107 |
| 4,852,151 | 7/1989 | Dittakavi et al. | 379/93.35 |
| 4,995,074 | 2/1991 | Goldman et al. | 379/93.35 |
| 5,134,650 | 7/1992 | Blackmon | 379/107 |
| 5,189,694 | 2/1993 | Garland | 379/406 |
| 5,204,896 | 4/1993 | Oliver | 379/107 |
| 5,239,575 | 8/1993 | White et al. | 379/107 |
| 5,243,644 | 9/1993 | Garland et al. | 379/106 |
| 5,311,581 | 5/1994 | Merriam et al. | 379/107 |
| 5,327,488 | 7/1994 | Garland | 379/201 |
| 5,363,431 | 11/1994 | Schull et al. | 379/67 |
| 5,394,461 | 2/1995 | Garland | 379/106 |
| 5,452,343 | 9/1995 | Garland et al. | 379/106 |
| 5,485,509 | 1/1996 | Oliver | 379/106 |
| 5,488,654 | 1/1996 | Oliver | 379/106 |
| 5,509,054 | 4/1996 | Garland | 379/107 |
| 5,519,767 | 5/1996 | O'Horo et al. | 379/93.35 |
| 5,528,675 | 6/1996 | Chen | 379/106 |
| 5,535,267 | 7/1996 | Schull | 379/107 |
| 5,550,902 | 8/1996 | Abbruscato | 379/106 |
| 5,566,236 | 10/1996 | MeLampy et al. | 379/207 |
| 5,579,378 | 11/1996 | Arlinghaus, Jr. | 379/106 |
| 5,579,381 | 11/1996 | Courville et al. | 379/107 |
| 5,583,923 | 12/1996 | Hoy et al. | 379/106 |
| 5,625,680 | 4/1997 | Foladare et al. | 379/201 |
| 5,651,060 | 7/1997 | Cohn et al. | 379/93.35 |

FOREIGN PATENT DOCUMENTS

WO9427396  11/1994  WIPO .............. H04M 11/00

*Primary Examiner*—Krista Zele
*Assistant Examiner*—Scott Wolinsky
*Attorney, Agent, or Firm*—Dennis J. Williamson

[57] ABSTRACT

The invention uses a suppressed ringing connection, switched through the existing call processing switch fabric, to connect between two customer premise equipments (CPEs) for long duration, low priority calls. The suppressed ringing connection is implemented such that the connection is disconnected if an incoming call to one of the CPEs or an outgoing request for service from one of the CPEs is made. If the suppressed ringing connection is disconnected due to a request for normal service to or from one of the CPEs, the system of the invention automatically reestablishes the suppressed ringing connection after the normal service call has ended such that the long duration suppressed ringing connection can be maintained on a quasi-permanent basis. As a result, the suppressed ringing connection can be maintained for long duration connections without disrupting normal incoming or outgoing service to either of the connected CPEs.

10 Claims, 3 Drawing Sheets

FIG. 2

| LOW PRIORITY CALL – CLASS OF SERVICE PARAMETERS | | | |
|---|---|---|---|
| SERVICE DEFINITION | LEVEL OF SERVICE I | LEVEL OF SERVICE II | LEVEL OF SERVICE III |
| MAXIMUM CALL LENGTH | 1 HOUR | 5 HOURS | UNLIMITED |
| TIMING OF DISCONNECTION | NO SPECIFICATION– IMMEDIATE | NON–IMMEDIATE: > 0 BUT < 5 SEC. | VARIABLE: > 5 BUT < 20 SEC. |
| INTERRUPT MESSAGE | NO MESSAGE | 5 SEC. PRIOR TO TERMINATION | USER DEFINED TIME INTERVAL PRIOR TO TERMINATION |
| DISCONNECTION OVERRIDE | NOT AVAILABLE | SERVICE ORDER DEFINED – YES | PER CALL DEFINED YES |
| REESTABLISH LOW PRIORITY CONNECTION | NO | YES – SERVICE ORDER DEFINED | YES – PER CALL DEFINED |
| MINIMUM CONNECT TIME GUARANTEE | NO | YES – 6 SECONDS | YES – VARIABLE SERVICE ORDER DEFINED |

METHOD AND APPARATUS FOR CONTROLLING REGULAR AND SUPRESSED RINGING CONNECTIONS IN A TELECOMMUNICATIONS NETWORK

CROSS-REFERENCE TO RELATED APPLICATION

This application is related to application Ser. No. 08/559,703 filed Nov. 15, 1995 by Stuart M. Garland and David B. Smith entitled "A System For Providing Prioritized Connections In A Public Switched Network" which application is assigned to the assignee of the present application.

BACKGROUND OF THE INVENTION

The invention relates generally to public switched networks and, more particularly, to a system for providing prioritized connections using a suppressed ringing connection.

It will be appreciated that in existing public switched telephone networks when a normal connection is made between telephone sets or other customer premise equipment (CPE) such as computers, terminals, multimedia equipment or the like, that connection remains established until it is manually disconnected at one of the CPEs. Thus, the established connection has a fixed priority over other calls to either of the two connected CPEs for the duration of the call. Any further attempt to connect to either of the two CPEs by a calling party will be denied, as indicated by a busy signal to the calling party, or by the institution of a service such as call waiting, call queuing, voice mail or the like. As a result, long duration connections between two parties, such as for continuous communications with a CPE or long term data transfers, tie up the connection and prevent either of the connected parties from making or receiving further calls.

It is also known in the art to provide suppressed ringing connections where a utility or other entity can access a CPE such as a utility meter for transmitting data without a ringing alert signal. An exemplary suppressed ringing system is described in U.S. Pat. No. 5,189,694 issued to Garland on Feb. 23, 1993. One feature of such a system is the ability to disconnect the connection when the called party goes off-hook. Thus, if a utility is reading a meter at a customer premise and that customer goes off-hook, the suppressed ringing connection is disconnected such that the outgoing call can be made. Such a system, however, does not disconnect the suppressed ringing connection when an incoming call to the customer is attempted. As a result, existing suppressed ringing connections are best suited for short duration connections such as meter reading or the like where the connection is maintained for a very short period of time and disruption of incoming calls is minimal.

Further, it is also known in the art to provide priority service to preselected individuals in certain limited circumstances. For example, military communications systems often grant priority to a high ranking officer's calls such that calls from that individual's line or directory number have a fixed priority over other calls. Such high priority calls can also be found in some government and corporate communications systems. These systems are limited to providing high priority service for a very narrowly defined group of individuals on a line by line basis who are accorded special status within a limited communications system and do not address the problem of long duration, low priority connections for general availability over a public switched telecommunications network.

Thus, a problem in the art exists in that there does not exist a prioritized connection over the public switched telecommunications network that does not prevent outgoing or incoming service to the connected parties and can be advantageously used for long duration connections.

SUMMARY OF THE INVENTION

The invention solves the above-noted problem and uses a suppressed ringing connection, switched through the existing call processing switch fabric, to connect two CPEs for long duration, low priority calls. The suppressed ringing connection is implemented such that the connection is disconnected if an incoming call to one of the CPEs or an outgoing request for service from one of the CPEs is made. The specific handling of the low priority call could be managed by a service profile maintained in the network for the customer that determines the process by which the connection is disconnected. In the preferred embodiment, if the suppressed ringing connection is disconnected due to a request for normal service to or from one of the CPEs, the system of the invention automatically reestablishes the suppressed ringing connection after the normal service call has ended such that the long duration suppressed ringing connection can be maintained on a quasi-permanent basis. As a result, the suppressed ringing connection can be maintained for long duration connections without disrupting normal incoming or outgoing service to either of the connected CPEs.

BRIEF DESCRIPTION OF THE DRAWING

FIG. 2 is an example of service parameters for managing the low priority connections;

DETAILED DESCRIPTION

Figure 1:
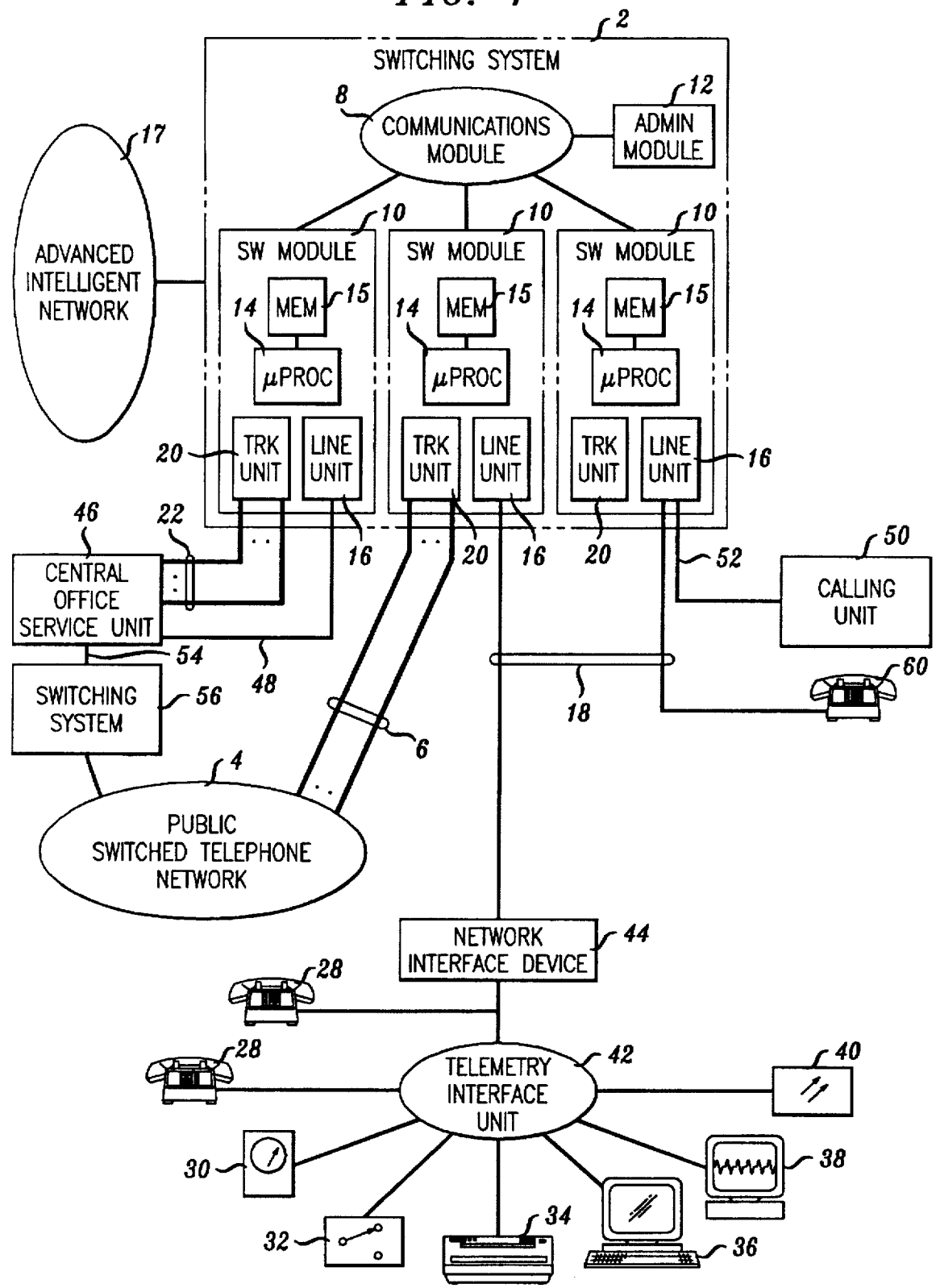
FIG. 1 is a block diagram showing the system of the invention.

Referring more particularly to FIG. 1 the system of the invention consists of a central office switching system 2 connected to other switches in the public switched network 4 over interoffice trunks 6 as is well known in the art. Switching system 2 can consist of one of the family of 5ESS® switches manufactured and sold by AT&T and described in U.S. Pat. No. 4,592,048 issued to Beckner et al. on May 27, 1986 and in *AT&T Technical Journal*, Volume 64, No. 6, part 2, pp. 1205–1524, or any other suitable switching system. Switching system 2 operates as is well known in the art to switch voice and data through the network. The architecture of one such switching system is shown and includes a communication module 8 forming a hub and having a plurality of switch modules 10, and an administration module 12 emanating therefrom. Each switch module 10 is controlled by microprocessor 14 and memory 15 and provides call processing, time division switching, and signaling for the lines and trunks to which it is connected. Each switch module includes line units 16 that provide interface to the local loops 18 that connect to the customer premise equipment 26 and trunk units 20 that provide interface to the trunks 6 that connect to other switches in the network as well as to the utility telemetry trunks (UTT) 22, as will hereinafter be described. The administration module 12 provides functions that can be centralized such as maintenance control, craft interface, text and data base management, call routing and time slot allocation. The administration module 12 consists of a control unit such as the AT&T 3B21D duplex processor and a main memory. In some switching systems, the administration module is assisted by a separate processor that performs some administrative functions. Communication module 8 is the hub of the switching system and allows communication between the administration module 12 and the switch modules 10. Communication module 8 consists of a message switch that provides the administration module-to-switch module and switch module-to-switch module message communication, and a time multiplexed switch providing the switch module-to-switch module and switch module-to-administration module time slot connection for voice and data communication and clock distribution. It is also known in the art to use an Advanced Intelligent Network (AIN) 17 where the AIN 17 can be accessed by switching system 2 to provide enhanced call processing services. The switching system 2 accesses the AIN 17 when a call processing request "hits" a preselected trigger in switching system 2 as is known in the art. The trigger can be a request for a particular call feature or service where the call processing for that service or feature is accomplished in the AIN 17.

Switching system 2 is connected to local loops 18 that physically consist of a pair of copper wires, cables or fiber defining local lines that connect to customer premise equipment (CPE) such as telephones 28, utility meters 30, appliance controllers 32, multimedia equipment 34, terminals 36, medical equipment 38, security equipment 40 or other devices. As described in co-pending application Ser. No. 08/522,215, entitled Loop-Back Test System Using A Suppressed Ringing Connection, filed Aug. 31, 1995, the CPEs can be connected to the local lines via a network gateway device or telemetry interface unit (TIU) 42 such that they are independently addressable to allow selective communication to any of the CPEs. A separate network interface device 44 (NID) may be provided to define the interface between the CPE and the network or the NID may be integral with the TIU. Such a network can support analog or Integrated Services Digital Network (ISDN) services for voice and data.

A central office service unit (COSU) 46 is connected to switching system 2 over one or more utility telemetry trunks (UTT) 22 for the trunk to line connection and by a dial up or dedicated line 48 for the service provider to calling party connection. A calling unit 50 is also connected to the switching system over a dedicated or dial up line 52. Calling unit 50 consists of any entity that requires a long term connection to a CPE on a low priority basis. In one exemplary embodiment, the CPE consists of medical equipment 38 such as a blood pressure monitor, heart monitor, respiratory monitor or the like and the calling unit 50 constitutes a monitoring station located in a hospital or other health care facility such that the health care facility receives continuous, long term, real time data regarding the monitored person's condition. In another exemplary embodiment, the CPE is a processor controlled appliance 40 such as a furnace, air conditioner or the like and the calling unit is an agency that continuously monitors the data from the appliance for energy use management or environmental control. The CPE could also consist of terminal 36 or multimedia equipment 34 that is receiving a long duration data transfer where the calling unit is the source of the data such as the Internet or a software service provider. It will be appreciated that the system of the invention can be used for any long term, low priority connection and that the calling unit and the associated CPE can perform a variety of functions. Moreover, while unit 50 has been defined as the "calling" unit, it will be appreciated that the call could be initiated from one of the CPEs. Finally, it is to be understood that the call could be between CPEs where the calling CPE establishes a suppressed ringing connection via entry of a numeric code or other directive as part of the call set up request.

As will be appreciated, line 48 is connected to line 52 through the switch fabric of switching system 2 in the same manner as normal voice and data connections to allow calling unit 50 to communicate with COSU 46. As explained in detail in U.S. Pat. No. 5,189,694 issued to Garland on Feb. 23, 1993; U.S. Pat. No. 5,243,644 issued to Garland et al. on Sep. 7, 1993; and U.S. Pat. No. 5,327,488 issued to Garland on Jul. 5, 1994, COSU 46 and UTT 22 are used to establish a suppressed ringing connection between, for example, a utility company and a utility meter located at the customer premise to allow the utility company to determine service usage by a customer. The suppressed ringing connection connects the utility or other entity to the CPE without an audible alert being displayed at the customer premise.

The existing suppressed ringing systems disconnect the suppressed ringing connection when the customer makes a request for service such as by going off hook. As a result, the suppressed ringing connection does not interrupt the customer's outgoing service. Because the suppressed ringing connection is used for relatively short duration calls (e.g. a meter reading connection may last for 2–5 seconds) there is no provision in the prior art for disconnecting the suppressed ringing connection when an incoming call is directed to the premise. When a request for a connection is made to a switching system hosting a local loop already connected over a suppressed ringing connection, the calling party receives a "busy" signal. As a result, existing suppressed ringing connections prevent incoming service. While incoming service is disallowed, the expected short duration of the calls makes this minimal interruption acceptable. Thus, the existing systems do not provide for disconnecting or interrupting the suppressed ringing connection for incoming calls or for long duration, low priority calls.

COSU 46, as is known, creates a many to one connection in which line 48 (which is connected to line 52 via switching system 2) can be connected to a plurality of UTTs 22. In this manner, COSU 46 serves to multiplex and demultiplex the signals as they are transmitted between line 48 and UTTs 22. UTTs are, in turn, connected to local lines 24 via the switching system 2. Existing COSU design is capable of processing a large number of calls simultaneously and more than one COSU can be associated with a switching system to increase the capacity for that switching system, if desired. As a result, exemplary calling unit 50 can communicate with a large number of CPEs simultaneously. Moreover, more than one calling unit can be connected to switching system 2 to access COSU 46 such that a plurality of entities be provided with the long duration, low priority connection of the invention from the same switching system.

It will be further appreciated that COSU 46 can be connected to more than one switching system, if desired, as illustrated in FIG. 1 where UTT 54 connects COSU 46 to a second switching system 56. As a result, a single calling unit can be connected to CPEs hosted by different switching systems. It is also known in the art to make the COSU 46 integral with the switching system.

To provide the long duration, low priority connections of the invention, the switching system 2 is provided with the ability to terminate the suppressed ringing connection for incoming as well as outgoing calls. It will be appreciated that in existing switching systems, when a connection is made to or from from a local line 24, the switch module 10 hosting the local line changes the status of the line from "idle" to "busy". In the illustrated switching system, the status is maintained in the memory 15 associated with line units 16 of the individual switch module 10; however, it will be appreciated that the status can be maintained at any location accessible by the switching system. As a result, when an incoming request for a connection to an occupied line is made, the switch module processor 14 checks the busy/idle status of the line. If the check shows the line as busy, the connection to that line cannot be completed and a busy tone is sent to the originating CPE indicating that the call cannot be completed.

To perform the method of the invention, it is necessary to distinguish between a normal call and the low priority call of the invention. Thus, when a suppressed ringing connection is made to a local line 24 hosted by a switch module 10, that switch module sets a status of "busy-low priority" such that when an incoming or outgoing request for a connection is made for that line for a connection having a higher priority, the switching system will be apprised that the existing connection is low priority and can be interrupted to allow the new connection to be made. By using the "busy-low priority" status, the low priority call can be disconnected for either an incoming or outgoing calls.

In order to set the "busy-low priority" status at the switch module 10, the switching system 2 must be aware that the originating connection request is for a low priority, suppressed ringing connection. This can be accomplished either by dedicating line 52 (connecting calling unit 50 to the switching system 2) to the handling only of these types of calls or by having the calling party (or equipment) input a code that is recognized by the switching system as requesting a low priority, suppressed ringing connection. In either event, the fact that the connection is a low priority, suppressed ringing connection will be known to the switching system and the line status in the switch module will be designated accordingly.

Because the suppressed ringing connection as used in the present invention is interrupted for both incoming and outgoing calls, its usefulness for long duration calls would be minimized absent some mechanism for reestablishing the connection after it is interrupted by a normal call. It will be appreciated that existing telephone systems offer a service to customers where if the customer dials a "busy" line, the switching system, either automatically as part of a subscription service or upon receipt of a request from the customer, will monitor the customer's line and the busy line and will establish a connection when both lines become idle. The system of the invention uses the same mechanism to reestablish the low priority call. Specifically, when a low priority call on a particular local line is interrupted by either an incoming or outgoing normal call, the switching system will monitor the local line and will automatically reestablish the low priority call when the normal call is ended, as indicated by a service profile. Referring to FIG. 1, the switching system monitors the line as is well known in the art to detect the on-hook condition, indicating that the normal call has ended, and reestablishes the low priority call either by reestablishing the low priority connection at the switch or by sending a signal to the original calling party indicating that the line is available and allowing the original calling party to initiate the new connection. Alternatively, the low priority call can be placed on hold as is known in the art, rather than being disconnected, when a higher priority call is received and can be reestablished after the higher priority call has ended.

Alternatively, the mechanism for reestablishing the call could be internal to calling unit 50. When the suppressed ringing connection is terminated, the calling unit can automatically reestablish the suppressed ringing connection as if it were a new connection, by making call set up attempts at regular time intervals (i.e. every 30 seconds) until the connection is reestablished. Thus, the low priority call can be effectively maintained indefinitely by automatically reestablishing the suppressed ringing connection after the interruption of the suppressed ringing connection.

To determine the specific handling of the low priority call, a service profile is created at the time of the customer's subscription to the service that defines how that customer's low priority calls are to be handled. The service profiles are created by selecting from various service parameters to create a system for handling low priority calls that is uniquely suited to that customer's needs.

Referring to FIG. 2, an exemplary service parameter table is illustrated showing various classes of service to which a customer can subscribe where each class of service provides for different handling of the low priority calls. It will be appreciated that the different classes of service can be provided at different tariff rates and that options other than those specifically described can be provided. Examples of different options available to the subscriber are defined in the first column and the different classes of service are defined in the three remaining columns. For example, for the lowest class of service, Level of Service I, the low priority call is ended immediately upon a request for normal service. The low priority call has a maximum length of one hour and no warning message is given to the subscriber prior to disconnecting the low priority call. The subscriber cannot override the termination of the low priority call and the network does not reestablish the low priority call upon disconnection of the normal call. Finally, there is no guaranteed minimum amount of time for which the low priority call will remain connected.

For a slightly higher fee the subscriber can obtain Level of Service II. Compared to the lower Level of Service I the subscriber obtains a longer maximum call length (e.g. 5 hours). Interruption of the low priority call is not immediate, rather the service provider allows a predetermined delay period (e.g. 0 to 5 seconds) during which time a warning is given to the subscriber that the low priority call will be disconnected and the subscriber is allowed to override the disconnection of the low priority call. Specifically, it is contemplated that the subscriber, by entering a predetermined code, can override the disconnection of the low priority call and in effect transform the low priority call into a normal call. Upon receipt of the coded signal from the customer the switch changes the status of the call, as maintained in the switch module, from "busy-low priority" to "busy-normal." In this class of service, the low priority call is also automatically reestablished upon disconnection of the normal call, as previously described, and the subscriber is guaranteed a minimum connect time (e.g. 6 seconds) before the low priority call can be disconnected.

The Level of Service III provides the subscriber with enhanced capabilities. For example, the maximum call length is longer (e.g. unlimited). The subscriber is also provided with the ability to define parameters such as the time delay before disconnection and the time at which a warning message is provided. The subscriber can also be provided with the ability to change parameters on a per call basis by keying in preselected codes. For example, before each call the subscriber can define if the low-priority call is to override a disconnection as previously discussed. The subscriber can also define on a per call basis if the low-priority call is to be reestablished and the length of the minimum guaranteed connection time.

It is also contemplated that the designation of a call as "low" priority can be made by the called party, rather than the calling party. For example, a customer could subscribe to a level of service where a call made to that customer (i.e. the customer is the called party) is automatically designated low priority by the switching system after the call has been connected for a predetermined period of time. In this manner, a called party, after being connected for a certain predetermined time period (e.g. 60 minutes), will receive any higher priority calls such that a lengthy call will not preclude incoming service to the called party indefinitely.

The service profile of the individual subscriber can be maintained in the memory 15 of switch module 10, in the AIN 17 or in any data base accessible by the switching system. While a selected set of parameters have been described with reference to FIG. 2, it will be appreciated that other parameters may be offered and that the combination of parameters is not limited to that specifically described. Moreover, the service provider could provide a single universal level of service if desired. It is also contemplated that multiple levels of prioritized service can be provided where the lowest priority level can be interrupted by any higher priority level. When multiple levels of priority are provided, the status of the call set in the switch module will consist of the designation "busy" and the specific priority level of the call such as "busy-priority one", "busy-priority two" or the like.

Moreover, the AIN can be used to control the handling of the calls in the system of the invention. Specifically, when a request for a connection from a CPE is received at switching system 2, a first AIN trigger is hit such that the AIN 17 gives the switching system the disposition of the request. For example, where the request is for a line connected on an existing call, AIN 17 could direct the switching system 2 to give a busy signal to the CPE or to interrupt an existing call, if the existing call has a lower priority than the incoming request for a connection, and complete the connection to the CPE. Likewise, when a call is ended, another AIN trigger is hit. In response to that trigger, the AIN 17 gives the switching system 2 the disposition for any previously interrupted call such as to reestablish or not to reestablish the interrupted call.

Operation of the system of the invention will be described with reference to FIG. 2. Operation begins when a calling unit or CPE requests a long duration, low priority call, such as by going off hook or by entering a predetermined code, and identifies a called CPE by entering a directory number or other distinctive code (block 201). Switching system 2 looks up subscriber service profile (block 202) and COSU 46 sets up a suppressed ringing connection between the calling unit and the CPE identified in the request and the switching system designates the status of the connection as "busy-low priority" (block 203). The suppressed ringing connection is maintained until a request for normal service to or from a CPE on the local line is made (block 204), at which time the low priority suppressed ringing connection is handled as set forth in the subscriber service profile (block 205). The switching system monitors the local line (block 206) and detects the disconnection of the normal call (block 207). When the normal call is ended the switching system determines if the low priority call is to be reestablished per the service profile (block 208). If the low priority call is to be reestablished, the illustrated process (blocks 203–208) is continued for every higher priority call to or from a CPE on the targeted line until the lower priority call is disconnected by one of the parties. If the low priority call is not to be reestablished, the subscriber line remains idle after termination of the normal call (block 209).

It is a further aspect of this invention to provide prioritized service using normal call processing treatment rather than using the suppressed ringing connection as described above. Using normal call processing treatment allows prioritized calls to be made from virtually any CPE. Referring more specifically to FIG. 1, assume that a calling party at telephone 28 wants to call a called party at telephone 60. While telephone 60 is shown being connected to the same switching system hosting telephone 28, it will be appreciated that telephone 60 could be hosted by another switching system in network 4. The calling party, upon initiating the dialing sequence for telephone 60, enters a predetermined alpha-numeric code in the telephone keypad indicating that calling party desires a low priority connection. Alternatively, a customer service profile maintained in switching system 2 could designate a line as always obtaining low priority service such that no entry of a code is required. It is to be understood that this class of service could be available to everyone in the network or that the customer must specifically subscribe to the service. Moreover, it is contemplated that the selection of the low priority connection can be provided at reduced rates to the customer.

Figure 3:
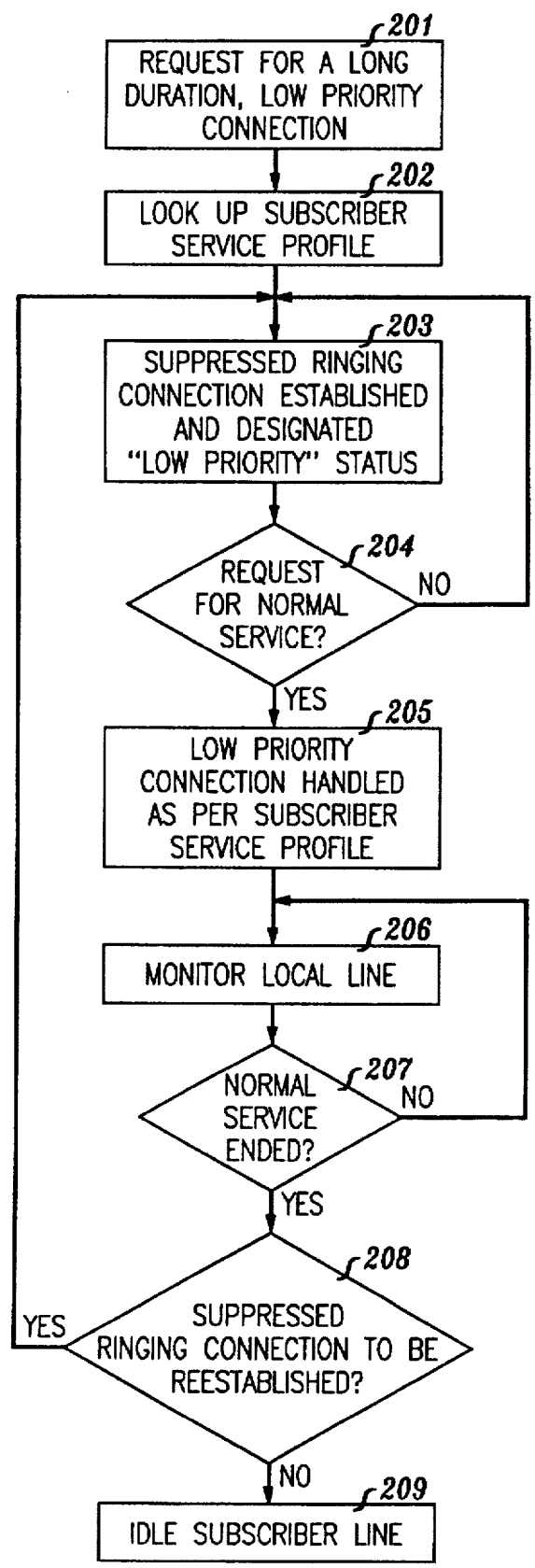
FIG. 3 is a flow chart showing the operation of the system of the invention.

The switching system 2, upon receipt of the code from telephone 28 or as otherwise instructed from the service profile of the called or calling party, completes the connection to the called party at telephone 60 and sets the status of the connection as "busy-low priority" in the memory of the switch modules hosting both the called party telephone 60 and the calling party telephone 28. Thus, if a higher priority call is placed to either of the two connected telephones, the low-priority connection is interrupted. The handling of the interrupted call can be done as previously described with reference to FIGS. 2 and 3 and more than one level of prioritization can be offered. The use of call prioritization using normal call processing does not provide all of the advantages of the suppressed ringing connection; however, it does make call prioritization generally available without the need for the hardware associated with the creation and management of suppressed ringing connections.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A system for controlling connections in a telecommunications network comprising:

a switching system for hosting a plurality of local lines and for switching calls to and from said local lines, customer premise equipment being connected to said lines;

means for establishing a suppressed ringing connection over a selected one of said plurality of lines to a particular customer premise equipment connected to said selected one of said lines;

means for disconnecting said suppressed ringing connection when a request for a regular connection over said selected one of said plurality of lines is made, said means for disconnecting operating in response to a service profile defining how the suppressed ringing connection is to be handled; and means for reestablishing said suppressed ringing connection when use of said regular connection is ended.

2. The system of claim 1, wherein said particular customer premise equipment constitutes a medical device.

3. The system of claim 1, wherein said particular customer premise equipment constitutes a processor controlled appliance.

4. The system of claim 1, wherein the means for establishing a suppressed ringing connection includes a central office service unit capable of establishing a plurality of suppressed ringing connections simultaneously.

5. The system of claim 1, wherein a calling unit is connected to the particular customer premise equipment.

6. The system of claim 5, wherein the means for reestablishing includes means, controlled by said calling unit, for periodically requesting that the suppressed ringing connection be established.

7. The system of claim 1, wherein said means for disconnecting includes means for identifying the suppressed ringing connection as low priority, said means for disconnecting operating in response to said means for identifying.

8. The system of claim 1, wherein said means for reestablishing includes means for monitoring the status of the selected one of the local lines after the means for disconnecting disconnects said suppressed ringing connection, said means for monitoring recognizing when said selected one of the local lines becomes idle.

9. The system of claim 1, wherein the service profile is variable such that the handling of the suppressed ringing connection can be varied.

10. A system for controlling connections in a telecommunications network comprising:

a switching system for hosting a plurality of local lines and for switching calls to and from said local lines, customer premise equipment being connected to said lines;

means for establishing a suppressed ringing connection over a selected one of said plurality of lines to a particular customer premise equipment connected to said selected one of said lines;

means for disconnecting said suppressed ringing connection when a request for a regular connection over said selected one of said plurality of lines is made including an advanced intelligent network (AIN) for providing a disconnect signal to said switching system for controlling disconnection of said suppressed ringing connection in response to a trigger hit by the request for said regular connection; and means for reestablishing said suppressed ringing connection when use of said regular connection is ended including a means for sending a reestablish signal from said AIN to said switching system.

* * * * *